(12) United States Patent
Ridelle-Berger

(10) Patent No.: US 7,712,952 B2
(45) Date of Patent: May 11, 2010

(54) MIXER DEVICE FOR DIVIDED SOLID WASTE

(75) Inventor: Jean Ridelle-Berger, Brignoles (FR)

(73) Assignee: Syndicat Intercommunal pour la Valorisation & l'Elimination des Dechets du Centre Ouest Var., Neoules (FR)

( * ) Notice: Subject to any disclaimer, the term of this patent is extended or adjusted under 35 U.S.C. 154(b) by 1079 days.

(21) Appl. No.: 10/565,074

(22) PCT Filed: Jul. 28, 2004

(86) PCT No.: PCT/FR2004/002025
§ 371 (c)(1),
(2), (4) Date: Mar. 28, 2006

(87) PCT Pub. No.: WO2005/011853
PCT Pub. Date: Feb. 10, 2005

(65) Prior Publication Data
US 2006/0176773 A1 Aug. 10, 2006

(30) Foreign Application Priority Data
Jul. 30, 2003 (FR) .................................. 03 09381

(51) Int. Cl.
*B01F 7/20* (2006.01)
(52) U.S. Cl. .................... 366/262; 366/312; 366/326.1; 366/330.4
(58) Field of Classification Search ................. 366/262, 366/266, 270, 322, 325.2, 326.1, 330.1, 330.4, 366/312
See application file for complete search history.

(56) References Cited

U.S. PATENT DOCUMENTS

| 431,372 | A | * | 7/1890 | Medlin ........................ 366/149 |
| 628,378 | A | * | 7/1899 | Wymonde .................... 210/219 |
| 690,375 | A | * | 12/1901 | Rubsch ........................ 366/147 |
| 2,448,927 | A | * | 9/1948 | Fischer ..................... 435/289.1 |
| 4,515,483 | A | * | 5/1985 | Muller et al. ................ 366/303 |
| 4,741,122 | A | | 5/1988 | Becsy et al. |
| 6,296,384 | B1 | * | 10/2001 | Yatomi et al. ............... 366/147 |

FOREIGN PATENT DOCUMENTS

| DE | 27 02 795 | 7/1978 |
| DE | 27 12 124 | 9/1978 |
| DE | 100 13 266 | 10/2001 |
| EP | 1 264 644 | 12/2002 |

OTHER PUBLICATIONS

Database WPI, Section Ch, Week 199827 Derwent Publicaitons Ltd., London, GB; AN 1998-300831, XP002276277 & jp 09 227262 A ((IGAR-N) Igarashi Kogyo KK) Sep. 2, 1997 abstract.
Patent Abstracts of Japan, vol. 1998, No. 10, Aug. 31, 1998 & JP 10 130082 A (Hitachi Ltd), May 19, 1998 abstract.

* cited by examiner

Primary Examiner—David L Sorkin
(74) Attorney, Agent, or Firm—Young & Thompson

(57) ABSTRACT

A mixer device for materials made up of various divided solid waste, in a vertical silo (1). The device includes the following: a central working area extending along the entire height of the silo (1); a peripheral zone; elements (6) which are distributed vertically at different successive levels (n1, n2, n3 ... n21) of the working area, along the entire height of the silo (1) and which can lift materials from each of the levels of the working area and release the materials; elements (1a, 19) for bringing matter from the upper part of the peripheral area to the lower center part of the silo (1).

15 Claims, 2 Drawing Sheets

MIXER DEVICE FOR DIVIDED SOLID WASTE

FIELD OF THE INVENTION

The present invention relates to a mixer device for materials, notably made up of various divided solids and waste, particularly applicable to the use of processes, such as the transformation of divided solids, the production of materials of the compost type, aerobic or anaerobic fermentation, drying, etc . . . Its object is also a method for applying such a device.

BACKGROUND OF THE INVENTION

It is known that in many industrial processes and notably in the field of chemical engineering, various exchanges and transfers are greatly improved by applying within reactors, systems capable of mixing or stirring the reacting material. In these reactors, one often resorts to stirrers with blades.

However, when the material which one desires to submit to stirring, comprises a significant portion of solid phases, these stirring means prove to be unsuitable, notably owing to hydrodynamic effects which remain limited in the vicinity of the stirrer and to the magnitude of the torque required for setting this solid phase into motion.

Mounting the reactor on a horizontal or tilted axis and providing rotation of the latter around this axis, were also proposed. Application of such devices however is unwieldy and therefore costly, and connecting them with external units is delicate. Moreover, they may be used with difficulty in the case of mixtures dealing with large amounts of material.

When the material to be mixed consists of various solid phases, it is known that notably due to gravity, the material is packed in the bottom of the reactor, so that the homogeneity of the solid phase is difficult to ensure and there follows generation of zones inside these reactors which develop, each at their own rate, finally producing differently transformed batches of material.

Moreover, it is known that during transformation of divided solids, the material frequently includes aggregates either existing initially or having formed gradually, either under the effect of chemical or biochemical reactions which release new substances, or because of the addition of a liquid phase directed to promote or cause the sought-after reactions.

Various systems applicable to the treatment of divided solid materials also comprising liquid or even gas phases, and including aggregates of materials, have been proposed.

Extracting the solid material from the reactor for example by means of devices with buckets, shovels, or worm-screws, and then turning up this material in order to fragment it by suitable means and then reload it into the reactor, were thus proposed.

So-called "counter-rotary" kneading devices which essentially consist of two coaxial mixing units, positioned in a vertical axis cylindrical reactor, i.e., a scraping unit positioned at the periphery of the reactor and a central unit consisting of three superimposed propellers, were also proposed, both of these units being provided with opposite directions of rotation so as to submit the material to be mixed to shear stress enabling the aggregates to be broken up. Such a device is however complex, so that it is unwieldy to manage both as regards investments and operation.

SUMMARY OF THE INVENTION

The object of the present invention is to propose a mixer device which not only provides regular distribution of the material, but also breaking-up of the aggregates thereof.

The object of the present invention is thus a mixer device for materials notably made up of various divided solid waste, in a vertical silo, characterized in that it includes:

a central working area extending along the entire height of the silo and a peripheral zone, means vertically distributed at different successive levels of the working area, along the entire height of the silo, capable of lifting the material from each of the levels of the working area and of releasing it, means capable of bringing material from the upper portion of the peripheral zone to the lower central portion of the silo.

The silo and the working area may have a shape of a cylinder, the working area being coaxial with the silo. The lifting means may consist of a vertical shaft coinciding with the axis of the silo, which will perform rotational motion, and which will be provided at each of said levels with at least one blade, the radius of which will define that of the working area, and which will have an angle of incidence relatively to the plane of the cross-section of the silo, this blade being tilted from the bottom upwards, and on the side towards which it is brought by the rotational movement towards the opposite side. This angle of incidence may optionally be adjustable.

The rotational velocity of the shaft will be relatively low, i.e., of the order of five to ten revolutions per minute.

Preferentially, the blades will be formed with planar elements in the shape of sectors with a centre angle between 20 and 120° and their dimension, in the radial direction, will substantially be between the fifth and the third of the silo's radius.

In an attractive embodiment of the invention, the shaft will be provided with a single blade per level and the blades of two successive levels will be angularly shifted relatively to each other by an angle of about 90°.

The means capable of bringing the material from the different levels located at the periphery of the silo to the lower central portion of the latter may be of the static type and will then consist of a bottom with a frustro-conical shape. These means may also be of the dynamical type and then consist for example of scraping components firmly attached to the rotary shaft, which are applied onto the internal wall of the silo's base.

The silo may include means for loading it through its upper portion, for example consisting of a hatch, and/or through its lower portion and they will consist of a worm-screw for example. This worm-screw has the advantage, if its rotational direction is reversed, of also acting as unloading means.

The silo may be used as a reactor so as to apply a physical and/or chemical treatment-process therein, such as for example a compost making process, and will then include for this purpose, means for feeding and/or extracting fluids as well as means for providing heating of its contents. It may then include heat insulating means relatively to the outside world.

The object of the present invention is also a method for providing the mixing of materials, notably made up of various divided solid waste, in a vertical silo, characterized in that it includes the steps:

lifting the material from different successive levels of a central zone of the silo and releasing it, bringing the material from the upper portion of the peripheral zone of the silo to the lower central portion of the latter.

BRIEF DESCRIPTION OF THE DRAWINGS

Embodiments of the present invention will be described hereafter as a non-limiting example, with reference to the appended drawings wherein.

DETAILED DESCRIPTION OF EMBODIMENTS

Figures 1, 2:
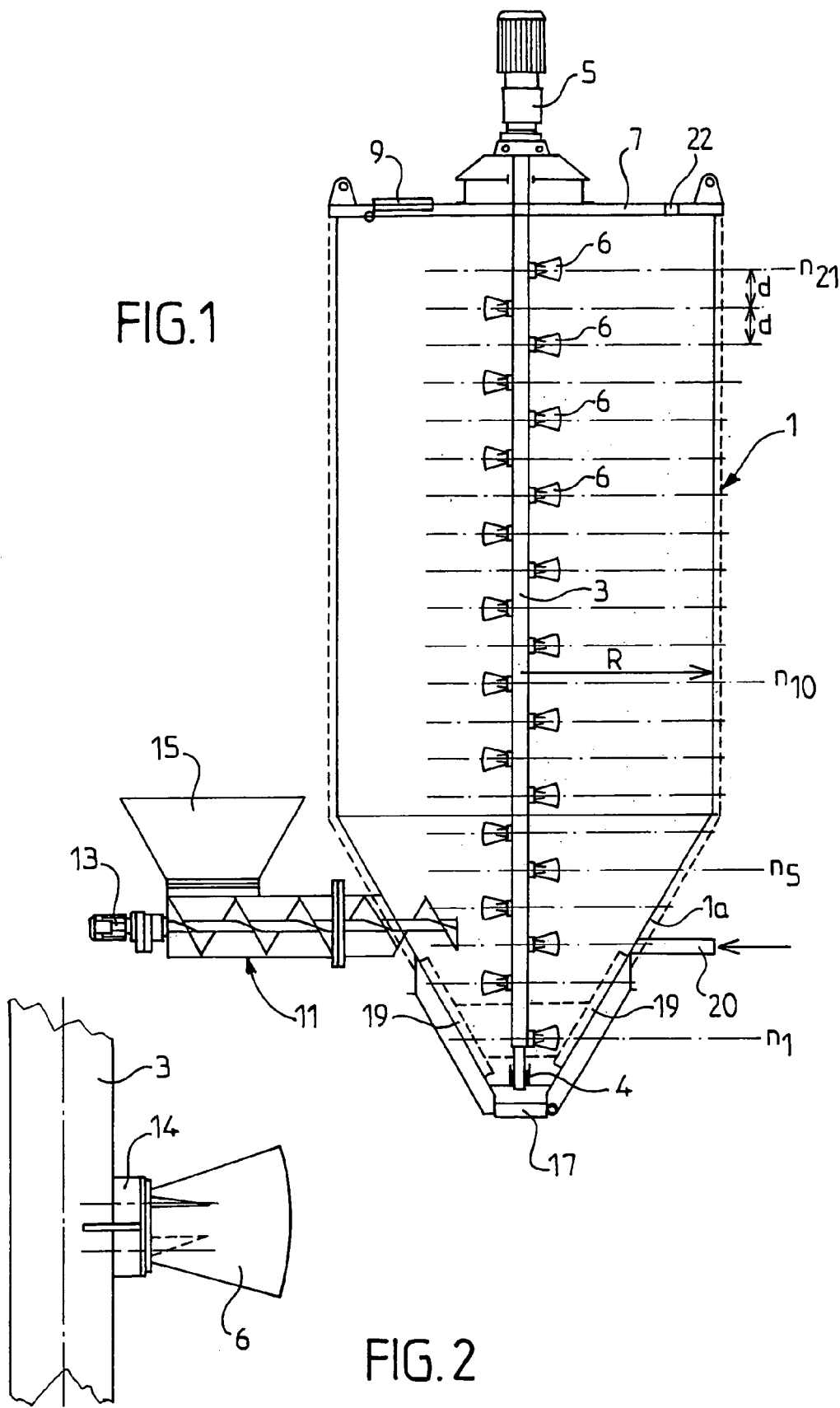
FIG. 1 is a schematic axial and vertical sectional view of a mixer device according to the present invention.
FIG. 2 is a vertical planar view of a shaft fitted with a blade used in the embodiment of the invention illustrated in FIG. 1.

In the embodiment of the invention illustrated in the figures, the mixer device consists of a cylindrical reactor 1 with a circular cross section and of radius R, which ends at its base with a frustro-conical portion 1a.

The reactor 1 is axially crossed by a shaft 3, which rests on its base on a bearing 4 and is firmly attached at its upper end, to a motor 5 fixed in the upper wall 7 of the reactor 1 and which ensures that it is driven into rotation at a low velocity, preferentially between 5 and 10 revolutions per minute.

The shaft 3 is provided with blades 6 which are positioned step by step along the entire height over different levels, which are spaced apart from each other by a distance d substantially equal to about ⅕ of the radius R of the reactor 1. In the embodiment illustrated in FIG. 1, the reactor is thereby separated into twenty-one levels $n_1, n_2, n_3 \ldots n_{21}$ which match the associated blades 6. The shaft 3 is provided with a single blade 6 per level and the blades of two successive levels are angularly shifted relatively to each other by an angle of about 90°.

Figure 4:
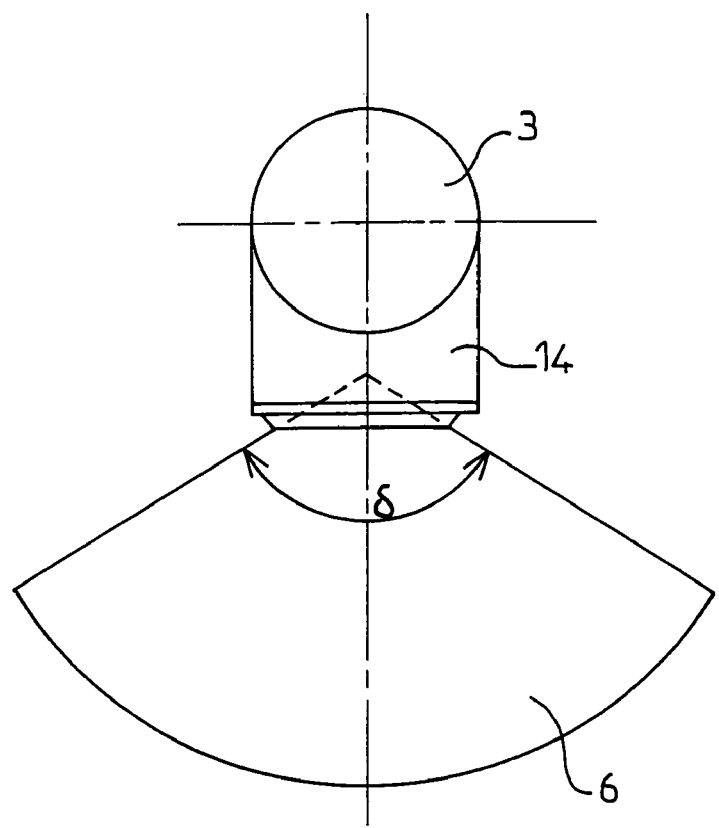
FIG. 4 is a planar view of the blade illustrated in FIGS. 2 and 3.

These blades 6, including one illustrated in a planar view in FIG. 4, substantially are in the shape of sectors with a centre angle δ which may be between 20 and 120° and preferentially between 80 and 120° and have a radius r, preferably between the fifth and the third of the radius R, of the reactor 1. The blades 6 are provided with a certain tilt, i.e., they are tilted by an angle α which may be between about 10 and 35°, relatively to the cross section S of the reactor.

The blades 6 are firmly attached to the shaft 8 via fixing components which consist of a base 12 welded onto the shaft 3 and of a cap 14 which will cover the latter and onto which each blade 6 is welded. Attachment of the cap 14 on the base 12 is provided by two screws 16 which pass through two holes 18 in a circular arc of the cap 14, so as to screw into the base 12, which allows adjustment of the angle of incidence α.

Figure 3:
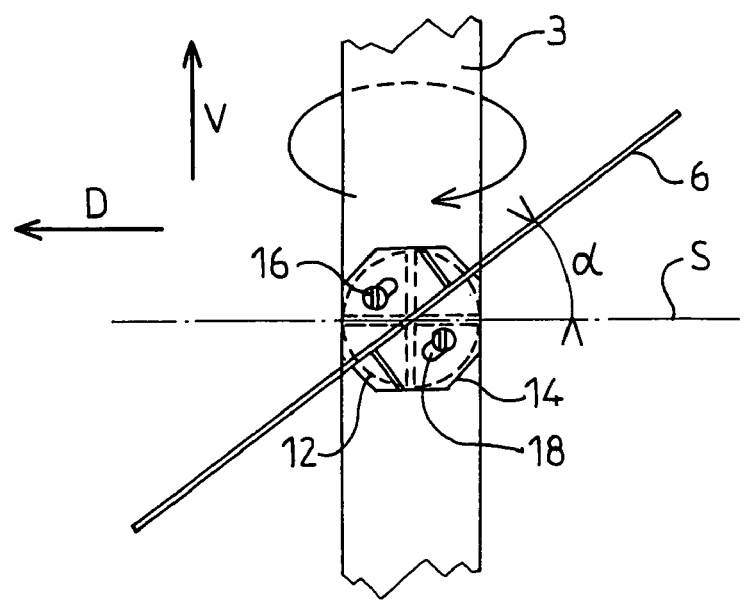
FIG. 3 is a front view of the blade illustrated in FIG. 2.

The blades 6 are tilted from the bottom upwards on the side towards which they are brought by the rotational movement D towards the opposite side of the latter (as illustrated in FIG. 3) so that, during this rotation, the material is lifted by the blades, slides on the latter, and falls back down again as soon as it moves beyond their upper edge $6_a$. A dual effect results from this.

A first effect is the disintegration of the material aggregates which originally exist and tend to form as a result of the compression of this material or of various reactions likely to occur inside the reactor. A second effect is the ascending movement of the material into the working area of the silo.

Indeed, during their rotation in the material, the blades generate a trail forming an empty space with no material, which begins to fill just after their passage, with material partly coming from the peripheral zone, so that the material lifted by the blades and which falls back into the trail of the latter, will then be superimposed to the material coming from the peripheral zone, hence a gradual rise of this material in the working area. At the same time, the material of the upper zone of the silo falls back, through the peripheral area towards the base of the latter. A kind of convection movement is thereby generated.

The silo may be fed with materials through a hatch 9 provided in its upper wall 7 and/or through its base 1a by means of a worm-screw system 11. The latter is driven into rotation by a motor 13 and is fed with materials to be mixed by a hopper 15. Extraction of the material after its mixing and possibly its treatment, may be provided through the base of the reactor 1 by means of a discharge hatch 17. This extraction may also be carried out by the worm-screw system 11 by simply reversing its direction of rotation.

The bottom 1a of the reactor 1 may include a scraper, which is illustrated in dotted lines in FIG. 1, and which is intended to prevent the material from durably adhering to the bottom of the reactor 1 and from piling up and thereby disrupting proper material flow in the peripheral zone of the reactor.

This scraper consists of two arms 19 firmly attached to the shaft 3 which, when the latter revolves, push back the material from the periphery to the centre of the reactor 1.

The base 1a of the reactor 1 may include a grid intended to allow liquids to flow. It may also include gas, notably air, feeding means 20, for example with a slight overpressure with which, in the upper wall 7 of the silo, a discharge port 22 is associated for generating flow of this gas inside the latter.

After having set the shaft 3 into rotation, one proceeds with loading the reactor 1 from the upper hatch 9, this prior setting of the blades 6 into rotation thereby prevents any packing of the material. When the reactor is used in addition to its material mixing function, for achieving a certain treatment process, for example for making compost from materials notably consisting of green waste, food waste, animal faeces, wood waste, etc . . . ; liquids, gases and even solids may be injected therein. In the case of compost making, green waste, straw, etc . . . may notably be injected from the worm-screw device 11 at the actual base of the reactor i.e., where the sludge is more liquid, whereby better homogenization of the material may be further provided.

So now, according to the invention, as the rotational movement of the blades 6 is performed at different levels of the reactor, the thereby generated convection movement within the latter causes both local mixing of the material and homogenization of the whole of the latter, respectively insofar that each "divided solid grain" statistically travels through the whole of the reactor.

Of course, the blades 6, which are of a planar shape in the embodiment described earlier, may be provided with different shapes including spiral shapes so as to possibly enhance the "lifting" movement of the material performed by the blades.

According to the invention, other means may also provide the achieved movements of the material, in the embodiment described earlier with blades.

The reactor, notably when it provides an additional function to that of the mixer, may advantageously be provided with devices for introducing liquids or gases during operation. These devices may be simple ports provided in the wall of the reactor, connected through pipes to liquid feeding or gas blowing systems. The devices for introducing liquid or gas may preferably be distributors such as assemblies of perforated pipes, with a small diameter, or diffusing plates with fine holes bored therein. An injection, notably of gas, may also be achieved by means of the shaft 3, if the latter is hollow. The shaft 3 will then be connected to the liquid or gas feeding system and will be provided with small ports positioned beforehand along its entire height so as to allow gas or liquid to diffuse within the bulk of material.

Very certainly, the liquids or gases introduced therein may be preheated prior to their introduction, so as to generate heat exchanges favourable to the desired transformations.

Heating the reactor may be attractive for applying reactions at a certain temperature. For this purpose, the latter may advantageously include a double shell in the interspace of which heating means will be positioned.

Hot air may also be sent into this interspace or electrical resistors preferentially positioned against the internal wall may also be positioned therein.

Alternatively, the heating means may be directly set up in the silo.

The invention claimed is:

1. A mixer device for materials made up of various divided solid waste in a vertical silo, said mixer device includes:
    a central working area extending along an entire height of the silo and a peripheral zone,
    lifting means vertically distributed at various successive levels of the working area, along the entire height of the silo, configured for lifting the material from each of the levels of the working area and releasing it, said lifting means comprising a plurality of planar blades that are each in the shape of a sector, with a center angle between 20 and 120°, and
    means configured for bringing the material from an upper portion of the peripheral zone to a lower central portion of the silo.

2. The device according to claim 1, wherein the silo is of a cylindrical shape, and the working area also has the shape of a cylinder coaxial with the silo, the lifting means further comprises a vertical shaft which coincides with a longitudinal axis of the silo, which performs a movement of rotation and which is provided at each of said levels with at least one of said blades, a radius of said blades defines that of the working area and has an angle of incidence relatively to a plane of a cross section of the silo, said blades being tilted from the bottom upwards and on a side towards which it is brought by the rotational movement towards an opposite side.

3. The device according to claim 2, wherein the rotational velocity of the shaft is of the order of five to ten revolutions per minute.

4. The device according to claim 2, wherein the angle of incidence of the blades is adjustable.

5. The device according to claim 2, wherein the dimension, in the radial direction, of a blade is substantially between a fifth and a third of the radius of the silo.

6. The device according to claim 2, wherein the shaft is provided with a single blade per level and the blades of two successive levels are shifted angularly relatively to each other by an angle of about 90°.

7. The device according to claim 1, wherein the means capable of bringing the material from the upper portion of the peripheral zone to the lower central portion of the silo are static and consist of a bottom with a frustro-conical shape.

8. The device according to claim 1, wherein the means capable of bringing the material from the upper portion of the peripheral zone to the lower central portion of the silo are dynamical and consist of scraping components firmly attached to a rotary shaft of the lifting means and which are applied onto the internal wall of the base of the silo.

9. The device according to claim 1, wherein the silo includes loading means through the upper portion.

10. The device according to claim 1, wherein the silo includes loading means through the lower portion, consisting of a worm-screw.

11. The device according to claim 10, wherein the loading means is configured to act as unloading means.

12. The device according to claim 1, wherein the silo is provided with heat insulation means relatively to the outside world.

13. The device according to claim 12, wherein the silo is provided with heating means.

14. The device according to claim 1, wherein the silo includes means for at least one of introducing and extracting fluids.

15. A mixer device for materials made up of various divided solid waste in a vertical silo, said mixer device includes:
    a central working area extending along an entire height of the silo and a peripheral zone,
    a plurality of planar blades that are each in the shape of a sector and that are spaced apart from each other and vertically distributed at various successive levels of the working area, along the entire height of the silo, said blades are configured for lifting the material from each of the levels of the working area and releasing the materials, and
    means configured for bringing the material from an upper portion of the peripheral zone to a lower central portion of the silo.

* * * * *